Jan. 19, 1960 N. W. FELDMAN ET AL 2,922,148
TRANSISTORIZED RELAY
Filed Sept. 23, 1957
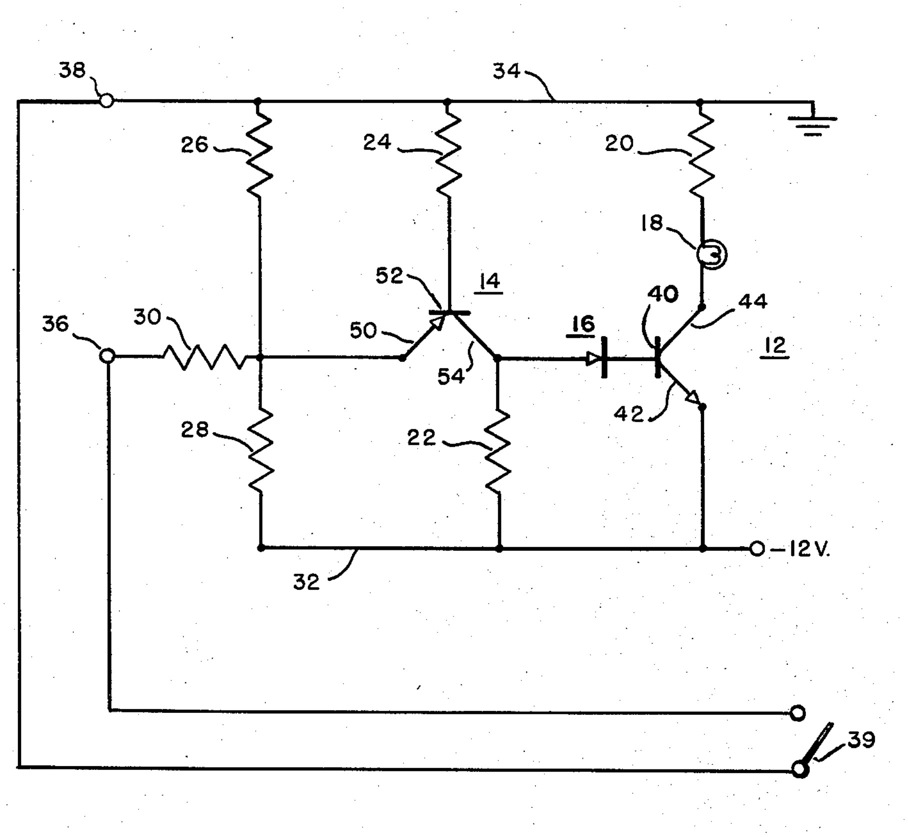
INVENTORS,
NATHAN W. FELDMAN &
THOMAS E. JACOBS.
BY
Harry M. Saragovitz
ATTORNEY.

United States Patent Office 2,922,148 Patented Jan. 19, 1960

2,922,148

TRANSISTORIZED RELAY

Nathan W. Feldman, Long Branch, N.J., and Thomas E. Jacobs, Syracuse, N.Y., assignors to the United States of America as represented by the Secretary of the Army Application September 23, 1957, Serial No. 685,761

7 Claims. (Cl. 340—248)

(Granted under Title 35, U.S. Code (1952), sec. 266)

The invention described herein may be manufactured and used by or for the Government for governmental purposes, without the payment of any royalty thereon.

This invention relates to switching circuits and more particularly to a transistorized switching circuit.

Switching circuits utilizing bistable multivibrators and circuits utilizing the negative impedance characteristics of a transistor for switching purposes are old in the art. In the latter, the transistor is driven suddenly from a nonconducting state to a conducting state giving a sudden reaction to a relatively slight action. This negative resistance phenomena of transistors is will known and has been described in much detail in the publication "The Transistor" prepared by Bell Telephone Laboratories in 1951, particular attention being called to the articles "Idealized Negative Resistance Characteristics of the Transistor," by R. L. Trent, pages 249–281; "General Considerations Concerning Nonlinear Circuits and Negative Resistances," by B. G. Farley, pages 237–248; and "Some Switching Aspects of Transistors," by A. E. Anderson, pages 283–333.

In the prior use of the negative impedance characteristics of a transistor the switching function is almost always actuated by the application of a voltage of either polarity. This requires additional circuitry or another source of voltage to provide the triggering signal.

The use of an on-off switch from a remote point is not always satisfactory because of the length of the line, which must be variable over a wide range, and because of the considerable variation in resistance and in leakage of lines of any length. In the case of remote switching the impedance is never zero because of the resistance in the lines to and from the switch to the operating circuit. On the other hand, the maximum line impedance is limited by the unavoidable leakage in the lines.

It is therefore an object of this invention to provide an improved switching circuit.

It is an additional object of this invention to provide a novel switching circuit that will provide a positive indication in response to a comparatively slight change of condition.

It is an additional object of this invention to provide an improved indicating device for use with a remote switch.

It is a further object of this invention to provide an indicating device that will function on a slight on-off margin of switching resistance.

These objects are accomplished by combining a sensitive triggering transistor, connected to operate in its negative range, with a power transistor carrying sufficient current to light a lamp or operate an indicating device. The triggering transistor is made responsive to variations in its input resistance over a narrow range.

A further description of this invention and additional objects thereof will be found in the following specifications taken in connection with the accompanying drawing, which shows a circuit diagram of a typical embodiment of the invention.

Referring now, more particularly, to the drawing, the circuit includes transistors 12 and 14, diode 16, lamp 18 and resistors 20 to 30 connected across the source of potential 32 with respect to ground 34. The control switch 39 is connected across terminal 36 and ground 38.

In this circuit the output or power transistor 12 is connected in a common emitter configuration with the emitter connected to the minus voltage line 32 and the collector connected in series with the lamp 18 and a resistance 20 which comprise the output load of the circuit. The input to transistor 12 is across the base electrode 40 and the emitter 42.

The triggering transistor 14 is connected in a common base configuration having its input across the emitter 50 and base 52. Resistance 24 connects the base electrode to ground and the output load resistance 22 connects the collector to the negative voltage terminal 32. The emitter 50 is connected between the voltage dividing resistances 26 and 28 which are connected across the voltage supply 32 to 34. The input connections 36 and 38 are in series with resistor 30 and resistor 26 of the emitter circuit so that changes in the input impedances will control the ratio of the impedances of the voltage dividing network 26, 28.

In operation, the circuit is adjusted so that with the control switch 39 open, the emitter 50 of transistor 14 is held in a negative condition relative to the base 52 by the voltage drop across resistor 26. Therefore, since the emitter voltage is held below that of the base, no current will flow from emitter to base. Consequently, no current will flow in the collector circuit and the transistor is effectively cut off.

The collector 54 is at a high negative potential since there is no current flowing through resistor 22 and no appreciable voltage drop across this resistor. Similarly, the voltage at the base 52 is near to ground potential because of the little current flowing through and minimum potential drop across resistor 24. There is not enough potential across resistor 22 to energize the diode 16 and transistor 12 remains cut off with no signal between its base 40 and emitter 42.

When the resistance between the emitter 50 of the triggering transistor 14 and ground 34 is decreased, by closing the switch, for example, the relative potential between emitter 50 and base 52 changes and, at a fairly critical point, the voltage of the emitter 50 becomes positive with respect to the base causing emitter current to flow. This, in turn, causes collector current to flow and increases the potential drop across both resistors 22 and 24 which drives the base potential further negative with respect to emitter 50 causing more current to flow in the emitter base circuit and accumulatively increasing the collector current until the transistor reaches saturation.

The increase in potential drop across the load resistance 22, as transistor 14 changes from a non-conducting to a conducting state, raises the potential of collector 54 above that of the base electrode 40 of the power transistor 12 so that the diode 16 can conduct and current will flow through the diode and across the base-emitter circuit of transistor 12 to the negative voltage point. This shunting circuit has the effect of reducing the impedance of the load 22 in the collector circuit of the transistor 14. This further serves to maintain the transistor 14 in a conducting state since the resultant increase in current in the collector circuit also increases the current across resistor 24 of the base circuit which maintains this transistor in its conducting state.

The flow of current across the input circuit 40 and 42 of transistor 12 causes the current to flow through the output circuit 44 and 42. This current passes through the resistor 20 and the indicator light 18. Thus, a change in resistance across the input is indicated by the lighting of the lamp 18. It should be noted that the transistor 12 does not need to go through a negative impedance range, since it is switched from a non-conducting to a fully conducting state by transistor 14. The current available in this transistor should be chosen with respect to the current required to light the lamp 18, so that a clear indication is given without damaging the lamp or the transistor due to overload. The resistance 20 serves as a limiting device to reduce the effects of surges of current.

When the impedance across the input of transistor 14 increases again, by opening the switch 39, the voltage applied to the emitter 50 decreases with respect to the voltage on the base electrode 52 until the flow of electrons is reduced, whereat the flow of collector electrons simultaneously decreases. Now the reverse effect, to that previously described, takes place and the decrease in current across the base resistor 24 causes a decrease in potential drop and the potential of the base 52 rises with respect to that of the emitter 50. In this way the switching effect is again cumulative and the transistor is suddenly driven from its saturation condition to a cut-off condition. With the transistor 14 cut off, the potential drop across resistor 22 is a minimum and the current flowing through diode 16 to the base 40 and the emitter 42 of transistor 12 is cut off, thereby cutting off its collector current and extinguishing the indicator lamp 18.

Thus, it is seen that a change in the resistance across the input terminals 36 and 38 can switch on and off the lamp 18 and, since the reaction of the transistor 14 to the resistance change is precipitous, it takes place over a relatively narrow range of resistances. This circircuit can be used to provide a positive indication of a remote switching in spite of line resistance and leakage.

The resistance 26 is added to bring the potential of the emitter 50 to within range of this critical point. This also limits the variation in voltage applied to the emitter to reduce potential damage to the transistor and increase the sensitivity of the circuit. The resistor 30 between the junction of the voltage divider and the input terminal 36 further decouples and protects the variout elements of this circuit. Resistance 20, which also serves as a limiting device, may also be omitted.

In the typical embodiment of this invention shown here, the transistor 12 is a 2N35 (NPN) type. The lamp 18 is a six volt type operating at 35 milliamperes. The transistor 14 is a 2N21 point contact type. Diode 16 is a silicon diode. Resistors 20, 22, and 24 are 100 ohms, 329 ohms, and 1,458 ohms, respectively. Resistors 26, 28, and 30 are 17,900 ohms, 4,214 ohms, and 500 ohms, respectively. This circuit accomplishes its switching function with the input resistance varied between 4,000 and 5,000 ohms.

Having thus described our invention, what is claimed is:

1. In a transistor switching circuit responsive to a change in impedance, a first transistor, a first load impedance, a source of potential, the output of said first transistor being connected to said source of potential through said first load impedance, a second transistor, a second load impedance, the output of said second transistor being connected to said source of potential through said second load impedance, a first and second resistor forming a voltage dividing network across said source of potential, an input to said first transistor being connected across one of said resistors, a variable impedance control circuit being connected across said one of said resistors, an input to said second transistor being connected across the first load impedance, and said first transistor having a conducting condition when said variable impedance is relatively low and a non-conducting condition when said variable impedance is relatively high, said first transistor passing through its negative impedance region when changing from its conducting to its non-conducting condition.

2. In a transistor switching circuit as in claim 1, a rectifier being connected in series with the input of said second transistor across said first load impedance, and a positive side of said rectifier being connected to said first load impedance.

3. In a transistor switching circuit as in claim 1, said second load impedance including an indicating device.

4. In a transistor switching circuit as in claim 1, a third resistor being connected in series with said variable impedance across said one of said resistors.

5. In a remotely controlled transistor circuit, a triggering transistor having emitter, collector and base electrodes operating on the negative impedance range of its characteristic curves, a power transistor having emitter, collector and base electrodes, the collector electrode of said triggering transistor being connected to the base electrode of said power transistor, a source of voltage having positive and negative terminals, first and second resistors being connected in series across said source of voltage, the emitter of said triggering transistor being connected to the junction of said first and second resistors, a third and fourth resistors, said third resistor connecting the base electrode of said triggering transistor to said positive terminal, said fourth resistor connecting the collector electrode of said first transistor to said negative electrode, the base electrode of said second transistor being connected to the collector electrode of said first transistor, the emitter electrode of said second transistor being connected to said negative terminal and an indicating device connecting the collector electrode of said second transistor to the positive terminal of said source of voltage, a remote switch, one terminal of said remote switch being connected to the junction of said first and second resistors, and the other terminal of said remote switch being connected to said positive terminal of said source of voltage.

6. An indicating system for a variable resistance input comprising a triggering transistor having emitter, collector and base electrodes and operating within the negative impedance range of its characteristic curves, a power transistor having emitter, collector and base electrodes, the output of said triggering transistor being connected to the input of said power transistor, a source of voltage having positive and negative terminals, a first and second resistors being connected in series across said source of voltage, the emitter of said triggering transistor being connected to the junction of said first and second resistors, a third resistor connecting the base electrode of said first transistor to the positive voltage terminal, a fourth resistor connecting the collector electrode of said first transistor to the negative electrode, the base electrode of said second transistor being connected to the collector electrode of said first transistor, the emitter electrode of said second transistor being connected to said negative terminal and an indicating device connecting the collector electrode of said second transistor to said positive terminal and said variable resistance input connected across said first resistor.

7. An indicating system for a variable resistance input as in claim 6 wherein said indicator is a lamp, and the current required to light the lamp is the rated current of the said power transistor.

References Cited in the file of this patent

UNITED STATES PATENTS

| | | |
|---|---|---|
| 2,772,410 | Logue | Nov. 27, 1956 |
| 2,783,457 | Flanagan | Feb. 26, 1957 |
| 2,829,257 | Root | Apr. 1, 1958 |

OTHER REFERENCES

"Principles of Transistor Circuits," by Shea, John Wiley and Sons, 1953, pages 426–432.